(12) United States Patent
Wang et al.

(10) Patent No.: US 11,079,594 B2
(45) Date of Patent: Aug. 3, 2021

(54) HEAD-UP DISPLAY DEVICE

(71) Applicant: BEIJING ILEJA TECH. CO. LTD., Beijing (CN)

(72) Inventors: Yanlong Wang, Beijing (CN); Shunping Miao, Beijing (CN); Jianhui Wang, Beijing (CN); Jianfeng Min, Beijing (CN)

(73) Assignee: BEIJING ILEJA TECH. CO. LTD., Beijing (CN)

( * ) Notice: Subject to any disclaimer, the term of this patent is extended or adjusted under 35 U.S.C. 154(b) by 37 days.

(21) Appl. No.: 16/327,595

(22) PCT Filed: Nov. 4, 2016

(86) PCT No.: PCT/CN2016/104740
§ 371 (c)(1),
(2) Date: Feb. 22, 2019

(87) PCT Pub. No.: WO2018/035974
PCT Pub. Date: Mar. 1, 2018

(65) Prior Publication Data
US 2019/0227310 A1    Jul. 25, 2019

(30) Foreign Application Priority Data
Aug. 23, 2016  (CN) .......................... 201610712737.5

(51) Int. Cl.
*G02B 27/01*   (2006.01)
*B60K 35/00*   (2006.01)
(Continued)

(52) U.S. Cl.
CPC .......... *G02B 27/0101* (2013.01); *B60K 35/00* (2013.01); *B60R 16/0373* (2013.01);
(Continued)

(58) Field of Classification Search
CPC .............. B60K 35/00; B60K 2370/155; B60R 16/0373; G02B 27/01; G02B 27/0101;
(Continued)

(56) References Cited

U.S. PATENT DOCUMENTS 4,780,906 A * 10/1988 Rajasekaran ........... G10L 15/02
704/237
5,037,182 A *  8/1991 Groves ..................... B60R 1/12
359/630
(Continued)

FOREIGN PATENT DOCUMENTS

CN    100462047 C  *  2/2009
CN    203305897 U     11/2013
(Continued)

OTHER PUBLICATIONS

Chinese Office Action dated Apr. 24, 2018, Application No. 2018041901633080, 3 pages.
(Continued)

*Primary Examiner* — Stacy Khoo
(74) *Attorney, Agent, or Firm* — Cantor Colburn LLP

(57) ABSTRACT

Disclosed is a head-up display device. The head-up display device includes: a host (1), configured to send an image signal to a display device (2); a display device (2) provided at one side of the host (1), configured to display the image signal; a curved semi-transparent reflecting screen (3) provided in a position opposite to the display device (2), configured to receive an image displayed by the display device (2), and display the image on the other side of the semi-transparent reflecting screen (3) at one side of the host (1), wherein the semi-transparent reflecting screen (3) is further configured to display the image after ghost is removed; a voice interaction unit (20) pre-configured in the host (1), and a driver detection device (12) mounted in the host (1). The head-up display device supports voice inter-
(Continued)

action throughout a process, driver real-time monitoring, and advance warning, and has good display effect.

7 Claims, 8 Drawing Sheets

(51) Int. Cl.
*B60R 16/037* (2006.01)
*G06K 9/00* (2006.01)
(52) U.S. Cl.
CPC ......... *G02B 27/01* (2013.01); *G02B 27/0149* (2013.01); *G06K 9/00845* (2013.01); *B60K 2370/155* (2019.05); *G02B 2027/013* (2013.01); *G02B 2027/014* (2013.01); *G02B 2027/0159* (2013.01); *G02B 2027/0161* (2013.01); *G02B 2027/0169* (2013.01)
(58) Field of Classification Search
CPC .......... G02B 27/0149; G02B 2027/013; G02B 2027/014; G02B 2027/0141; G02B 2027/0159; G02B 2027/0161; G02B 2027/0169; G06K 9/00845
See application file for complete search history.

(56) References Cited

U.S. PATENT DOCUMENTS

| | | | |
|---|---|---|---|
| 9,560,448 B2* | 1/2017 | Hartung | G10L 25/78 |
| 2005/0232469 A1* | 10/2005 | Schofield | B60W 30/18 |
| | | | 382/104 |
| 2006/0036430 A1* | 2/2006 | Hu | G06F 40/211 |
| | | | 704/10 |
| 2009/0112593 A1* | 4/2009 | Konig | G06F 16/332 |
| | | | 704/251 |
| 2012/0168058 A1* | 7/2012 | Kim | B29D 11/0073 |
| | | | 156/101 |
| 2012/0188652 A1* | 7/2012 | Kang | G02B 27/0101 |
| | | | 359/633 |
| 2013/0002797 A1* | 1/2013 | Thapa | H04M 3/002 |
| | | | 348/14.01 |
| 2015/0367442 A1* | 12/2015 | Bovatsek | C03B 33/0222 |
| | | | 65/112 |
| 2016/0025973 A1 | 1/2016 | Guttag et al. | |
| 2017/0082854 A1* | 3/2017 | Watanabe | G02B 27/0025 |
| 2017/0236330 A1* | 8/2017 | Seif | G06F 3/013 |
| | | | 345/633 |

FOREIGN PATENT DOCUMENTS

| | | | | |
|---|---|---|---|---|
| CN | 203544376 U | * | 4/2014 | |
| CN | 104216119 A | | 12/2014 | |
| CN | 204037446 U | | 12/2014 | |
| CN | 204989625 U | | 1/2016 | |
| CN | 105527710 A | | 4/2016 | |
| CN | 205263405 U | | 5/2016 | |
| CN | 105654753 A | | 6/2016 | |
| CN | 105842850 A | | 8/2016 | |
| CN | 105527710 B | | 11/2018 | |
| DE | 102011101912 B3 | | 6/2012 | |
| JP | 11326823 A | * | 11/1999 | |
| WO | 2015186488 A1 | | 12/2015 | |
| WO | WO-2016127204 A1 | * | 8/2016 | ......... G06K 9/00288 |

OTHER PUBLICATIONS

Chinese Office Action dated Jan. 11, 2019, Application No. 2019010802060200, 10 pages.
ISR/WO dated May 5, 2017, PCT Application No. PCT/CN2016/104740, 4 pages.

* cited by examiner

--Prior Art--

HEAD-UP DISPLAY DEVICE

TECHNICAL FIELD

The present disclosure relates to an in-vehicle smart device, and particularly to a head-up display device.

BACKGROUND

Head-Up Display (hereinafter referred to as HUD) is flight auxiliary equipment widely used in aircrafts. Head-up means that a pilot can see important information he needs without bowing his head.

At present, there are still following defects in the HUDs.

1. Most of them merely can display information such as vehicle speed and amount of fuel, but do not have operating functions at all.

2. They are defective in implementation principle, that is, vehicle related information is usually projected onto glass, coated lens (beam divider), and then reflected into driver's eyes.

3. In display manners, projection is usually performed with a projector based on LED principle, and an image is displayed on an imaging membrane, through which the driver can see related information of the vehicle. Besides, use of the projector is restricted by an imaging distance, thus affecting overall appearance of the HUD device.

4. Information displayed by the HUD might be unclear, particularly in a situation where it is exposed to strong light ahead. In addition, image ghost also may appear, affecting the driver's driving.

5. The imaging distance of the HUD is not far enough for a focal length to tally and be matched with driving sceneries inside the vehicle, thus failing to resolve the problem of integration of a road surface and a dashboard far and near.

SUMMARY

A technical problem to be solved in the present disclosure is to provide a smart in-vehicle device supporting voice interaction throughout a process and having good display effect.

In order to solve the above technical problem, the present invention provides a head-up display device, including:

A host, configured to send an image signal to a display device, wherein the host obtains driving information of a vehicle via connection with an OBD interface inside the vehicle or a USB interface of an in-vehicle charger, and correspondingly displays the obtained information on the display device;

A display device provided at one side of the host, configured to display the image signal, wherein the display device provided at one side of the host is capable of displaying the image signal;

A curved semi-transparent reflecting screen provided in a position opposite to the display device, configured to receive an image displayed by the display device, and display the image on the other side of the semi-transparent reflecting screen at one side of the host, wherein the semi-transparent reflecting screen is further configured to display the image after ghost is removed. With the curved semi-transparent reflecting screen, which reflects as a "mirror", the image displayed in the display device can be directly presented, thus changing the prior art in terms of display manner in which projection is usually performed with a projector based on the LED principle, as well as the inherent design of imaging on a windshield or a projection screen.

Further, the display device is a flexible display screen, configured to change the image projected onto the curved semi-transparent reflecting screen by adjusting a shape of the flexible display screen, and correct image distortion in the display device. The flexible display screen, which uses PHOLED (phosphorescent OLED) technology and has a low-consumption, directly visual flexible panel, can effectively overcome the image distortion.

Further, the display device is a laser projector, configured to project the image through laser beams; moreover, a micro-lens array (hereinafter referred to as MLA) is provided between the curved semi-transparent reflecting screen and the laser projector, and configured to modulate the display of the laser beams on the curved semi-transparent reflecting screen. Light sources in the display device are converged through the MLA. Diffuse reflection effects of the laser beams through the curved semi-transparent reflecting screen are modulated, thus avoiding damage to human eyes and relieving visual fatigue, reasonably controlling scattering angles of light and ensuring luminance.

Further, the display device is one or more from TFT, LCD, OLED or AMOLED displays. In the present disclosure, multiple substitution forms to the display device are provided.

Further, the host and the display device are an integral structure, and the host is integrally molded with the display device, thus facilitating delivery and manufacture.

Further, the curved semi-transparent reflecting screen is movable with a foldable mechanism.

The foldable mechanism is equipped with a damped rotation shaft or an electric memory adjusted rotation shaft based on user information.

Further, the ghost is removed from the image after following treatments are performed for the semi-transparent reflecting screen:

Surface hardening both a concave surface and a convex surface of the semi-transparent reflecting screen when molding the semi-transparent reflecting screen;

Providing a semi-transparent mirror film to the concave surface;

Providing an AR anti-reflection film to the convex surface;

Additionally providing an Anti fingerprint film to the concave surface and/or the convex surface; and performing cutting for sides of the semi-transparent reflecting screen.

Further, the host is provided with a base, with a rotating locking platform is mounted on the base, and the rotating locking platform is configured to be locked on a slide rail on the base. It is available to adjust the image on the curved semi-transparent reflecting screen via a placement angle of the host. Configured with the rotating locking platform and the slide rail, the host can be conveniently adjusted in angle and direction.

Further, the display device further includes a dissipation duct system built inside the host, configured to guide convection of hot air produced by the display device and a microprocessor in the host, wherein the dissipation duct system includes a heat pipe, cooling fins, and a fan, wherein the heat pipe is connected to the cooling fins, and configured to transfer received heat to the cooling fins;

the cooling fins are configured to dissipate heat in the display device and the microprocessor; and the fan is configured to cool the cooling fins.

Further, the display device further includes a shielding cover, and a heat-conducting plate, wherein the shielding cover is connected to the display device and the microprocessor through the heat-conducting plate, and the shielding cover is connected to the dissipation duct system.

The present disclosure further aims at solving a technical problem of providing a smart in-vehicle device capable of monitoring a driver in real time and notifying an intelligent warning in a driving process.

The present disclosure further provides a head-up display device, including:

A host, configured to send an image signal to a display device;

The display device provided at one side of the host, configured to display the image signal;

A curved semi-transparent reflecting screen provided in a position opposite to the display device, configured to receive an image displayed by the display device, and display the image on the other side of the semi-transparent reflecting screen at one side of the host; and a driver monitoring device mounted in the host, configured to determine face state information of a driver according to face information, wherein the state information at least includes emotional state information on distraction, fatigue, and road rage, and Monitor and warn fatigue of the driver according to the face state information, real-time environment information, and real-time vehicle traveling speed.

The driver detection device mounted in the host can monitor the driver and a traveling environment of the vehicle via a front/rear camera in the host, and capture the face state information of the driver via the front camera, to analyze the driver's emotions so as to emphasize analysis and warning treatment on three types of emotions: distraction, fatigue, and road rage, effectively ensuring driving safety.

Further, the driver detection device includes a camera and a night vision compensation light unit.

The camera is configured to collect overall face state information, head three-dimensional posture information, and information on opening/closing of eyes and mouth of the driver.

The night vision compensation light unit is configured to perform light compensation when illumination intensity inside/outside the vehicle is lower than a threshold. The problem of insufficient light inside/outside the vehicle during night driving is taken full account of when the night vision compensation light unit is designed.

Further, the host further includes a direction sensor, an acceleration sensor, a GPS, a temperature sensor, and a geomagnetic sensor, wherein the temperature sensor is configured to sense a temperature inside the vehicle and dissipate heat, the geomagnetic sensor is configured to detect a direction, the direction sensor is configured to determine a heading or backing direction of the vehicle and measure the vehicle traveling distance, the acceleration sensor is configured to detect braking and start of the vehicle, the GPS is configured to locate a vehicle position and access a map. With access of multi-purpose sensors, the host can obtain abundant vehicle traveling information, and perform relevant information input optimization treatment.

The present disclosure further aims at solving a technical problem of providing a smart head-up display device capable of performing smart voice interaction, so as to realize voice control throughout a process.

The present disclosure further discloses a head-up display device, including:

A host, configured to send an image signal to a display device, and collect sounds, and process an input;

The display device provided at one side of the host, configured to display the image signal;

A curved semi-transparent reflecting screen provided in a position opposite to the display device, configured to receive the image displayed by the display device, and display the image on the other side of the semi-transparent reflecting screen at one side of the host;

A voice interaction unit pre-configured in the host, configured to search in a database according to information input by a user via voice, wherein if there are multiple eligible search results, a driver is reminded to make a choice. With the voice interaction unit, the driver can realize operations of multiple functions inside the vehicle, for example, awakening the device, traveling navigation, playing music; meanwhile, when the host is connected via Bluetooth to smart devices such as mobile phone of the driver, making a call, sending messages, sending WeChat messages and so on can be realized via the host. At the same time, the voice interaction unit can support voice interaction in the navigation process, so as to realize smart bargain, eliminate echo of voices, and so on.

Further, the voice interaction unit is further configured to:

Semantically parse user's natural voice information of the same meaning in different expression manners, and execute corresponding search;

Performing the search according to an input search result, wherein if a unique position is precisely found, this result is used;

If multiple possible search results are found, secondary inquiry is needed, and further confirmation is made according to multiple times of natural voice input, wherein if a unique result is precisely found, this search result is used, otherwise, continue with the inquiry or remind repetition.

Further, the voice interaction unit is further configured to:

collect a voice input of the driver while the host outputs a voice;

detect the voice input of the driver via VAD detection; and suspend voice playing of the host when the voice input of the driver is detected.

Further, the voice interaction unit further includes an echo elimination device, wherein the echo elimination device includes a first path of input and a second path of input;

The first path of input is configured to collect an outside voice input;

The second path of input is configured to connect an output of a speaker of the host with an input of a microphone, wherein time points of the first path of input and of the second path of input above are synchronized, and echo is eliminated according to an AEC algorithm respectively.

Further, the display device further includes a multi-channel voice output unit, configured to output different types of operation voices to different acoustic units, such that the driver simultaneously hears voice output results of different operations.

The present disclosure further aims at solving a technical problem of providing a smart head-up display device capable of performing smart voice interaction, driver real-time monitoring, and advance warning, and having good display effect.

The present disclosure further provides a head-up display device, including:

a host, configured to send an image signal to a display device;

a display device provided at one side of the host, configured to display the image signal;

a curved semi-transparent reflecting screen provided in a position opposite to the display device, configured to receive an image displayed by the display device, and display the image on the other side of the semi-transparent reflecting screen at one side of the host, wherein the semi-transparent reflecting screen is further configured to display the image after ghost is removed;

a voice interaction unit pre-configured in the host, configured to search in a database according to information input by a user via voice, wherein if there are multiple eligible search results, a driver is reminded to make a choice; and a driver detection device mounted in the host, configured to determine face state information of the driver according to face information, and monitor and warn fatigue of the driver according to the face state information and real-time vehicle traveling speed.

Further, the head-up display device further includes a remote control device, wherein the remote control device is configured to awaken, turn on, and turn off the host within a set range, and adjust imaging angles of the display device and of the curved semi-transparent reflecting screen.

Further, warning in the driver detection device includes one or more selected from image information reminder, sound reminder, light reminder, and odor stimulation to the driver.

Further, the voice interaction unit is further configured to receive an external instruction to realize activation, wherein the activation manner includes: customized voice awakening, voice awakening phrase, physical button, and gesture.

Further, the voice interaction unit is further configured to receive in one step all information input by a user, and the information input at least includes: voice activation, entering a location navigation/result inquiry, setting a destination/result, and setting a path planning.

Further, a warning manner in the driver detection device is dynamically adjusted according to speeds.

Further, the warning manner is: sending a message to a pre-set contact to inform a current state of the driver.

Further, the display device and the curved semi-transparent reflecting screen are both electrically rotated to adjust an angle; a distance of a virtual image seen by the driver is adjusted by adjusting a relative distance between the display device and the curved semi-transparent reflecting screen. Preferably, an imaging device screen is designed to be parallel to an outer tangent plane of a central point of a reflecting screen, which can reduce deformation caused by different reflection distances of upper and lower parts of the image.

Further, the display device and the host are provided on a rearview mirror, the curved semi-transparent reflecting screen is provided on a dashboard, and the image is displayed after primary reflection.

Further, the display device acquires from external equipment an image that needs to be displayed in a manner of wireless or wired connection.

Further, the present disclosure further provides a split head-up display device, including:

a host, configured to send an image signal to a display device;

a display device provided at one side of the host, configured to display the image signal;

a total reflection screen, configured to perform primary reflection for an image displayed by the display device, and form a virtual image upon secondary reflection of a windshield;

a shadow shield located at one side of the total reflection screen, configured to block reflection light, wherein the display device and the host are provided on a rearview mirror, the total reflection screen is provided on a dashboard, and the image is displayed on a front windshield upon two times of reflection;

a voice interaction unit pre-configured in the host, configured to search in a database according to information input by a user via voice, wherein if there are multiple eligible search results, a driver is reminded to make a choice; and a driver detection device mounted in the host, configured to determine face state information of a driver according to face information, and monitor and warn fatigue of the driver according to the face state information and real-time vehicle traveling speed.

The present disclosure has following beneficial effects:

1) By employing the display device provided at one side of the host, configured to display the image signal, the curved semi-transparent reflecting screen provided in a position opposite to the display device and configured to receive the image displayed by the display device, and display the image on the other side of the semi-transparent reflecting screen at one side of the host, the display manner of the HUD is revolutionized, the deficiency of the current imaging based on the LED projection principle is overcome, and meanwhile image ghost, light refraction, and light reflection are effectively eliminated.

2) Since the host is provided with the base, the rotating locking platform is mounted on the base, and the rotating locking platform is configured to be locked on the slide rail on the base, the flexible and open design facilitates adjusting the host in angle and direction.

3) The driver detection device is mounted in the host, configured to determine face state information of the driver according to face information, wherein the state information at least includes emotional state information on distraction, fatigue, and road rage. The driver's emotions are analyzed by the driver detection device, enhancing analysis of and warning treatment on three emotions of distraction, fatigue, and road rage, effectively ensuring driving safety. Distinguished from the current common auxiliary driving in an ADAS advance driver assistance system, the driver detection device is better-targeted and more real-time.

4) The voice interaction unit is pre-configured in the host, configured to search in a database according to information input by a user via voice, wherein if there are multiple eligible search results, a driver is reminded to make a choice. Based on the multifunction voice interaction unit, the driver can be allowed to search and navigate a destination position, inquire network information via networking, play music, make a call, and send WeChat messages, the inconvenience of manual operation and potential safety hazard in the driving process are taken into full consideration, and voice control is realized throughout a process.

5) Due to the host, the display device, the curved-surface semi-transparent reflecting screen, the voice interaction unit, and the driver detection device in the head-up display device, optimized display of the vehicle traveling information of the in-vehicle HUD, smart voice interaction control, and real-time monitoring of the driver driving state are realized, overcoming operation defects existing in the current HUDs, such as a relatively long space distance required for reflection projection imaging, ghost in the image, and lack of operating functions for the HUDs.

Figure 1:
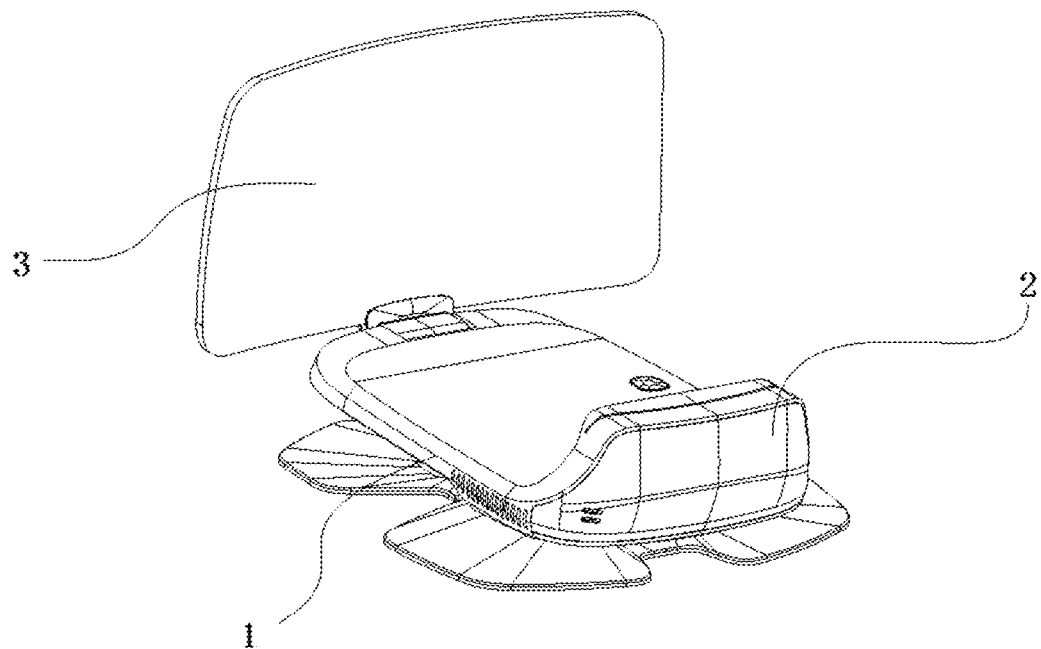
FIG. 1 is a schematic diagram showing effect of an external structure of a head-up display device in the present disclosure.

IN THE FIGURES 1 host
2 display device
3 curved semi-transparent reflecting screen
12 driver detection device
13 camera
14 night vision compensation light unit
15 acceleration sensor
16 direction sensor
17 geomagnetic sensor
18 temperature sensor
2 display device
3 curved semi-transparent reflecting screen
20 voice interaction unit
21 microphone

DETAILED DESCRIPTION OF THE EMBODIMENTS

In order to make the objects, technical solutions, and advantages of the present invention more clear and understandable, the present invention is further described in detail below in conjunction with embodiments with reference to accompanying drawings.

Figure 2A:
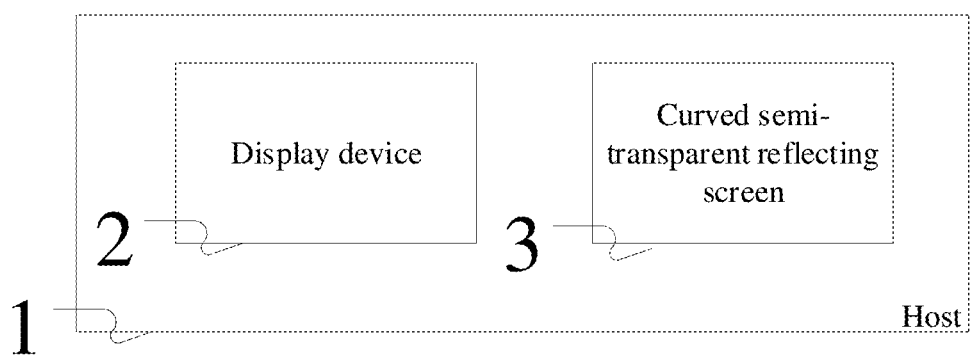
FIG. 2(a) is a principle block diagram of the head-up display device in the present disclosure.

As shown in FIG. 1, it is a schematic diagram showing effect of an external structure of a head-up display device in the present disclosure. FIG. 2(a) is a principle block diagram of the head-up display device in the present disclosure.

The head-up display device in the present embodiment includes: a host 1, configured to send an image signal to a display device, wherein the host obtains driving information of a vehicle via connection with an OBD interface or a USB interface of an in-vehicle charger (the USB interface is inserted in a cigarette lighter) inside the vehicle, and correspondingly displays the obtained information on the display device; a display device 2 provided at one side of the host, configured to display the image signal, wherein the display device provided at one side of the host is capable of displaying the image signal; a curved semi-transparent reflecting screen 3 provided in a position opposite to the display device, configured to receive an image displayed by the display device, and display the image on the other side of the semi-transparent reflecting screen at one side of the host, wherein the semi-transparent reflecting screen is further configured to display the image after ghost is removed. With the curved semi-transparent reflecting screen, which reflects as a "mirror", the image displayed in the display device can be directly presented, thus changing the prior art in terms of display manner in which projection is usually performed with a projector based on the LED principle, as well as the inherent design of imaging on a windshield or a projection screen.

Figure 2B:
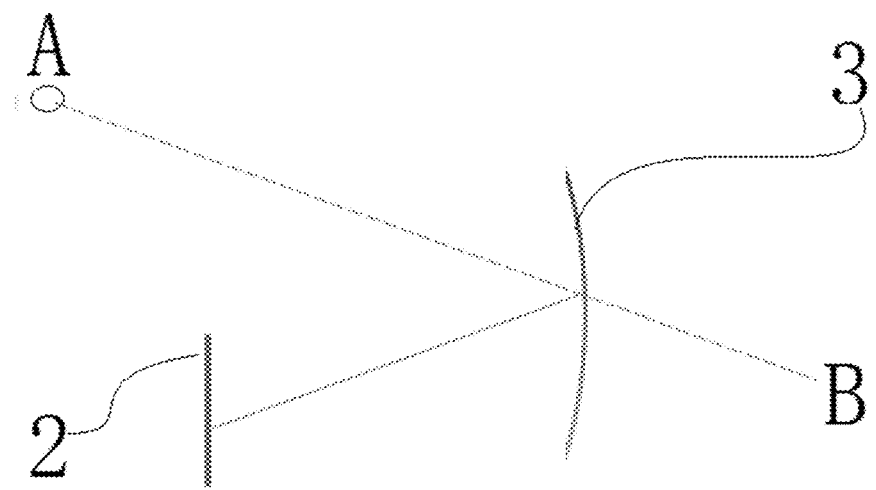
FIG. 2(b) is a principle diagram of the head-up display device in the present disclosure.

Referring to FIG. 2(b), it is a principle schematic diagram of the head-up display device in the present disclosure, wherein A represents a position where driver's eyes are located, and B represents a position where an enlarged and zoomed-out virtual image is located. The display device 2 provided at one side of the host is configured to display the image signal; the display device provided at one side of the host is capable of displaying the image signal. The curved semi-transparent reflecting screen 3 provided in the position opposite to the display device 2 is configured to receive the image displayed by the display device, and display the image on the other side of the semi-transparent reflecting screen at one side of the host, such that the enlarged and zoomed-out virtual image at the position B can be seen at the position A, thus overcoming the deficiency of imaging based on the current LED projection principle. In the above, the imaging is based on a reflection imaging principle of a concave mirror, in which after the display device 2 is projected onto the curved semi-transparent reflecting screen 3, the enlarged and zoomed-out virtual image is formed at the other side of the semi-transparent reflecting screen through the semi-transparent reflecting screen.

In some embodiments, providing at one side of the host means providing at a terminal end or distal end of the host.

In some embodiments, providing at one side of the host means molding an integral convex structure with the terminal end of the host.

In some embodiments, the position opposite to the display device refers to the other end corresponding to the terminal end of the host, preferably, parallel to the position where the display device 2 is located.

Based on the above distinguishing technical features, the present embodiments at least have following effective effects: with the display device 2 provided at one side of the host and the curved semi-transparent reflecting screen 3 provided in the position opposite to the display device, display of image information in a vehicle traveling process is realized with a simple imaging principle, thus overcoming the deficiency of the current manner of projection imaging, and satisfying requirements of placement on different control consoles and effective imaging in different traveling sceneries. Since the semi-transparent reflecting screen is further configured to display the image after the ghost is removed, a universal defect in most of current in-vehicle devices is effectively solved.

In some embodiments, the display device 2 is a flexible display screen, configured to change the image projected onto the curved semi-transparent reflecting screen by adjusting a shape of the flexible display screen, and correct image distortion in the display device. The flexible display screen, which uses PHOLED (phosphorescent OLED) technology and has a low-consumption, directly visual flexible panel, can effectively overcome the image distortion. Since the image distortion might exist when the display device 2 outputs the image information, the image distortion is corrected by preferably choosing the flexible display screen as the display device, the image projected onto the curved semi-transparent reflecting screen can be effectively changed, and the image distortion is overcome.

Figure 5A:
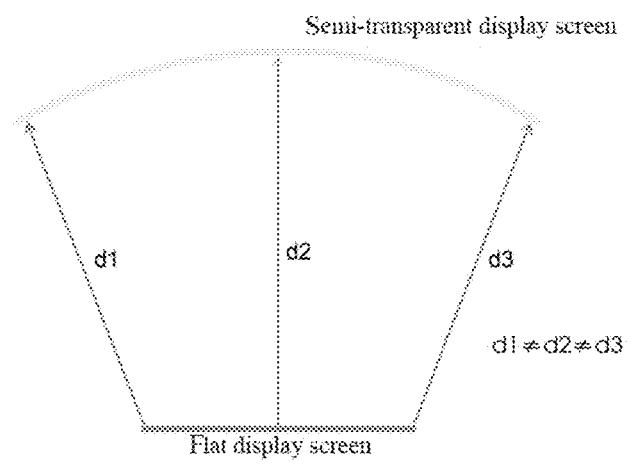
FIG. 5(a) is a schematic diagram showing an imaging manner of a flat display device in the prior art.
Figure 5B:
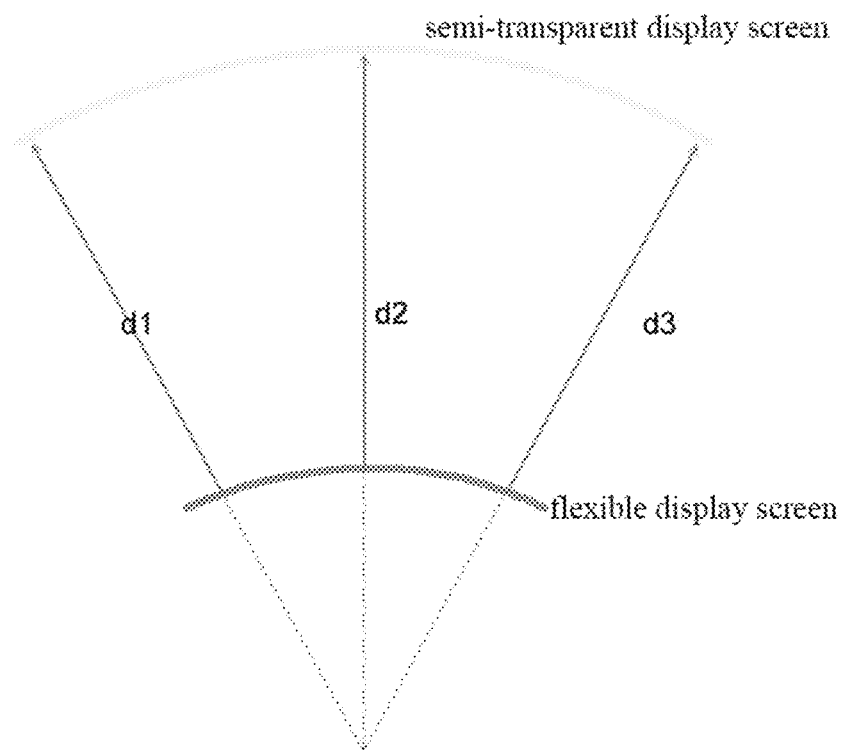
FIG. 5(b) is a schematic diagram showing an imaging manner of a flexible display screen in the present disclosure.

Specifically, the image distortion is resulted from cooperation of a spherical semi-transparent reflecting screen with a conventional flat display screen. As shown in FIG. 5(*a*), taking TFT as an example, distances from various pixels of the image to a spherical surface are different, which leads to different optical paths of the virtual image, and results in the image distortion. As shown in FIG. 5(*b*), in the present embodiment, the flexible display screen is used, and the flexible display screen can be bent, to ensure a consistent optical path from each pixel point to the spherical semi-transparent reflecting screen, thus solving the problem of image distortion.

Figure 6:
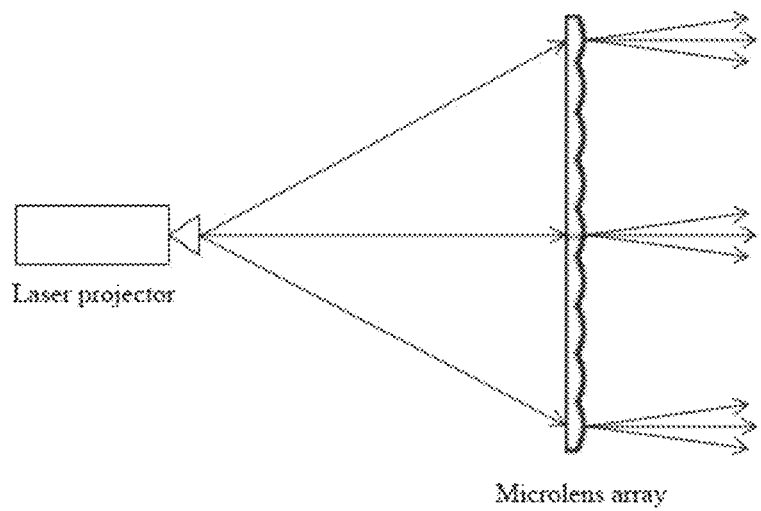
FIG. 6 is a schematic diagram of an embodiment when the display device in FIG. 1 is a laser projector.

As shown in FIG. 6, in some embodiments, the display device is a laser projector, configured to project the image through laser beams; moreover, an MLA is provided between the curved semi-transparent reflecting screen and the laser projector, and configured to modulate the display of the laser beams on the curved semi-transparent reflecting screen. Light sources in the display device are converged through the MLA. Specifically, the display device is the laser projector, configured to project the image through the laser beams, and modulate diffuse reflection effects of the laser beams through the curved semi-transparent reflecting screen, thus avoiding damage to human eyes and relieving visual fatigue, reasonably controlling scattering angles of light and ensuring luminance.

In some embodiments, the display device is one or more from TFT (Thin Film Transistor), LCD, OLED or AMOLED displays. In the present embodiment, multiple substitution forms to the display device are provided. In the above, TFT refers to a thin film transistor. A TFT display screen is usually used in mainstream display equipment of various types of notebook computers and desktop computers. The TFT display has advantages such as high responsiveness, high luminance, and high contrast, such that the head-up display device renders optimal treatment at an output end.

Preferably in the present embodiment, the host 1 and the display device 2 are an integral structure, and the host is integrally molded with the display device, thus facilitating delivery and manufacture.

Preferably in the present embodiment, the curved semi-transparent reflecting screen 3 is movable with a foldable mechanism. The foldable mechanism is a damped rotation shaft or an electric memory adjusted rotation shaft based on user information. When the foldable mechanism is a damped rotation shaft, the curved semi-transparent reflecting screen 3 can be closed through own gravity. When the foldable mechanism is an electric memory adjusted rotation shaft based on user information, the foldable mechanism can be manipulated by a step motor to lift and lower automatically, and meanwhile, can have a memory function for different drivers based on the user information. For example, a driver A is used to adjust the curved semi-transparent reflecting screen 3 and the display device 2 to be parallel while forming 30° with the host; while a driver B, due to his/her body height, is used to adjust the curved semi-transparent reflecting screen 3 and the display device 2 to be parallel while forming 45° with the host, and these pieces of information can be memorized by the host, and different adjustments are conducted according different drivers identified by a camera.

In some embodiments, the ghost is removed from the image after following treatments are performed for the semi-transparent reflecting screen:

molding the semi-transparent reflecting screen, and surface hardening both a concave surface and a convex surface of the semi-transparent reflecting screen, wherein surface hardening can improve surface hardness of a Combiner semi-transparent reflecting screen, scratch resistance of products, as well as an adhesion force of a subsequent coating;

providing a semi-transparent mirror film to the concave surface, wherein the semi-transparent mirror film serves to reflect the image; providing an AR anti-reflection film to the convex surface, wherein the anti-reflection film serves to improve light transmittance of the concave surface, and prevents ghost from occurring, besides, as the anti-reflection film is of different colors, a colorless anti-reflection film may be preferred; the concave surface and/or the convex surface is additionally provided with an AF fingerprint-proof film, which serves to decrease smudging; and finally performing all-around cutting for the semi-transparent reflecting screen, wherein the all-around cutting mainly aims at solving the problem of image distortion caused by uneven edges after injection molding of the Combiner.

Figure 3:
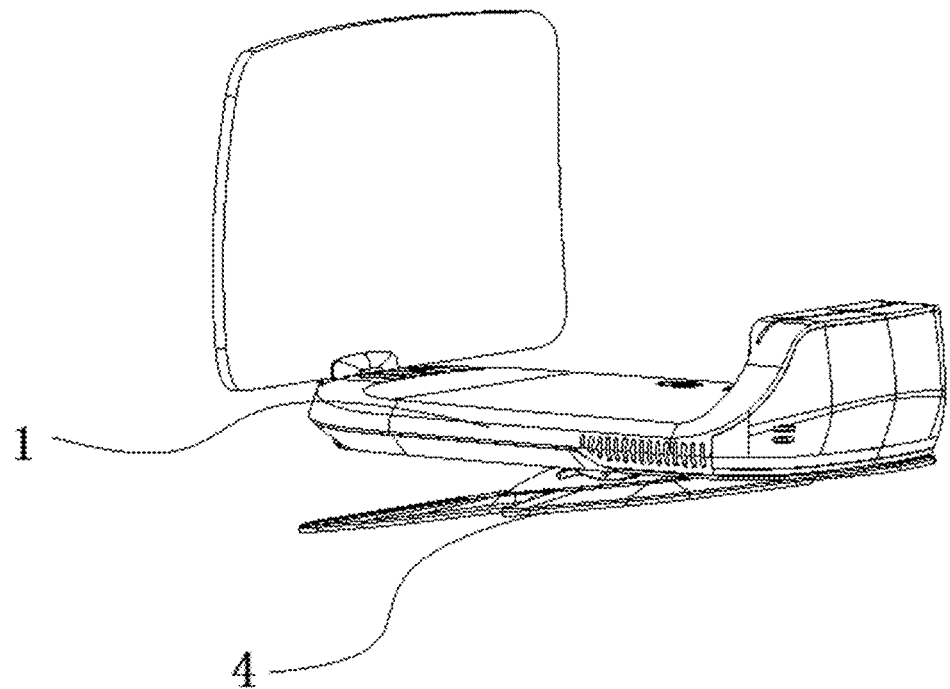
FIG. 3 is a schematic diagram of the head-up display device in FIG. 1 according to a preferred embodiment (a base is added).
Figure 4:
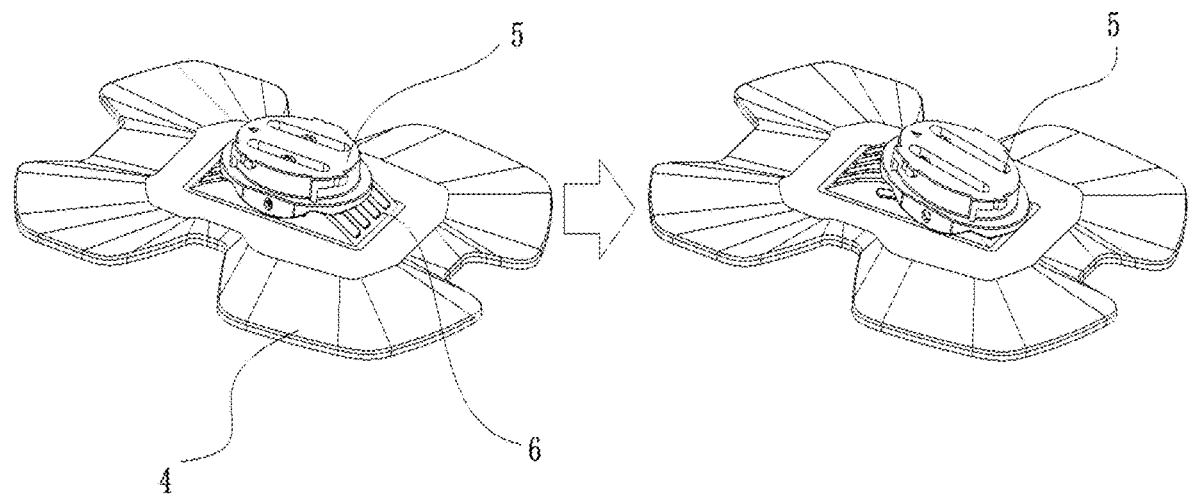
FIG. 4 is a schematic diagram of the base in FIG. 3 according to a preferred embodiment.

As shown in FIG. 3, it is a schematic diagram of the head-up display device in FIG. 1 according to a preferred embodiment (a base is added), and FIG. 4 is a schematic diagram of the base in FIG. 3 according to a preferred embodiment.

The head-up display device in the present embodiment includes: a host 1, configured to send an image signal to a display device, wherein the host obtains driving information of a vehicle via connection with an OBD interface or a USB interface of an in-vehicle charger inside the vehicle, and correspondingly displays the obtained information on the display device; the display device 2 provided at one side of the host, configured to display the image signal, wherein the display device provided at one side of the host is capable of displaying the image signal; a curved semi-transparent reflecting screen 3 provided in a position opposite to the display device, configured to receive an image displayed by the display device, and display the image on a curved side of the semi-transparent reflecting screen, wherein the semi-transparent reflecting screen is further configured to display the image after ghost is removed. Preferably in the present embodiment, the host is provided with a base 4, configured to be placed on a maneuvering desk, to prevent the host from sliding or shifting from position during driving. A rotating locking platform 5 is mounted on the base 4, and the rotating locking platform 5 is configured to be locked on a slide rail 6 on the base, and adjust the image on the curved semi-transparent reflecting screen via a placement angle of the host. By designing the rotating locking platform 5 and the slide rail 6, the host can be conveniently adjusted in angle and direction. When the host slides in the slide rail 6 through the rotating locking platform 5, the image on the curved semi-transparent reflecting screen can be adjusted via the placement angle.

In some embodiments, the rotating locking platform 5 is enabled to slide on the slide rail 6 through two fixed rivets.

In some embodiments, the slide rail 6 may be provided with multiple tracks, ensuring stability in sliding.

In some embodiments, the slide rail 6 is designed in a convex spherical structure, which serves an effective buffering function while saving the space.

In some embodiments, the rotating locking platform 5 and a groove in a bottom portion of the host 1 cooperate and fit with each other.

Figure 7:
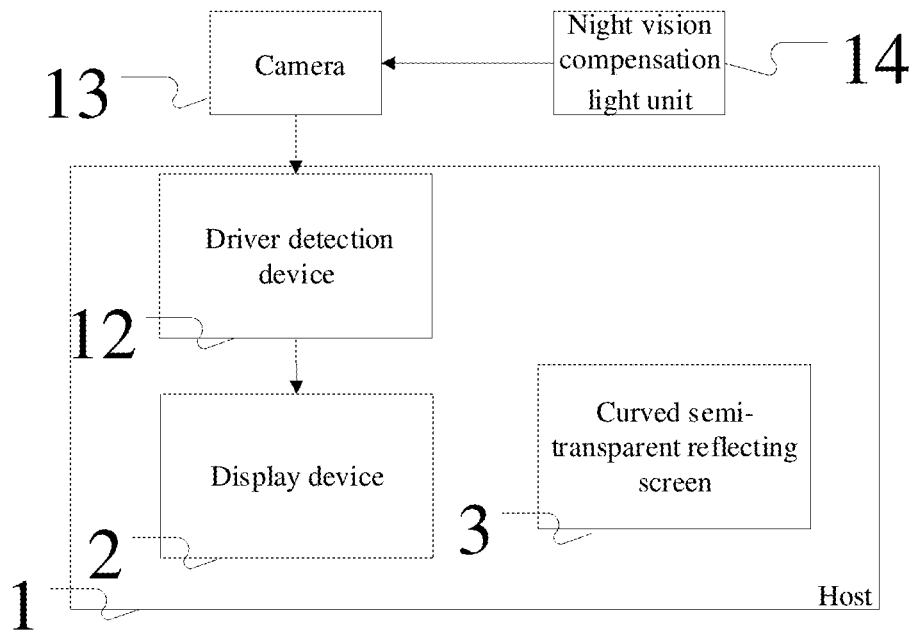
FIG. 7 is a structural schematic diagram of the head-up display device in the present disclosure.

In some embodiments, the base 4 supports left and right rotation of the rotating locking platform 5. FIG. 7 is a structural schematic diagram of a head-up display device in the present disclosure.

The head-up display device in the present embodiment includes: a host 1, configured to send an image signal to a display device; the display device 2 provided at one side of the host 1, configured to display the image signal; a curved semi-transparent reflecting screen 3 provided in a position opposite to the display device 2, configured to receive an image displayed by the display device 2, and display the image on a curved inner side of the semi-transparent reflecting screen 3; and a driver detection device 12 mounted in the host, configured to determine face state information of a driver according to face information, and monitor and warn fatigue of the driver according to the face state information, real-time environment information, and real-time vehicle traveling speed, wherein the state information at least includes emotional state information on distraction, fatigue, and road rage.

The driver detection device mounted in the host can monitor the driver and a traveling environment of the vehicle via a front or/and rear camera in the host, and capture the face state information of the driver via the front camera, to analyze the driver's emotions so as to enhance analysis of and warning treatment on three emotions of distraction, fatigue, and road rage, effectively ensuring driving safety.

According to International Organization for Standardization (ISO), distracted driving refers to a phenomenon that in driving attention is directed to activities irrelevant to normal driving, thus causing reduced driving operation capability. The distracted driving usually is inattention due to deviation of a line of sight or distraction of the driver and is a common and major cause of traffic accidents. This factor is particularly remarkable in rear-end collisions. If deviation of the line of sight or distraction of the driver is detected by the camera, confidence degree of such information is determined in the host.

In the present embodiment, the distracted driving means that the line of sight of the driver inside the vehicle is away from the right front for a set period of time, which includes but is not limited to following behaviors: possibly playing mobile phone, operating a center console, and turning around and talking.

In some embodiments, whether the driver's line of sight is right directed to the front can be determined by analyzing a three-dimensional orientation of the driver's face through an image. Compared with the prior art, the present embodiment has following beneficial effects: for the distracted driving which is a major potential hazard affecting driving safety, whether the driver's line of sight is right directed to the front is determined through the three-dimensional orientation of face, so as to detect whether the driver is distracted.

Fatigue driving refers to a phenomenon of physiological malfunction and mental malfunction of a driver after prolonged continuous driving, and objectively declined driving ability. Factors of fatigue driving include, for example, environment inside the vehicle: bad air quality, poor ventilation; too high or too low temperature; loud noise and violent vibration; improper seat adjustment; strained relationship with occupants, and so on; environment outside the vehicle: driving in the afternoon, in the evening, in the early morning, late at night; poor road conditions; good but unitary road conditions; driving in sandy, rainy, foggy, snowy weather and the like; operating conditions: driving far for a long period of time; too fast or too slow vehicle speed; too-restrictive arrival time to a destination.

Causes of road rage driving include, but are not limited to: misuse of headlight; cutting in line; frequent beeping of a vehicle behind; electro-mobile being in a motor way.

In some embodiments, the emotion of anger is detected by the camera. For example, road rage driving detection feature further includes: frequent rapid acceleration/rapid deceleration.

If the driver's state is detected by the camera as belonging to fatigue driving, the driver's fatigue is monitored and warned according to judging conditions.

Preferably in the present embodiment, the fatigue driving detection features include, but are not limited to: opening and closing degrees of eyes, for example, whether an opening degree of eyes is smaller than a set value by a proportion exceeding a set threshold, and/or continuous eye closing time exceeds a set threshold.

In some embodiments, the face state information includes, but is not limited to, multiple key points located within a face area, mainly including points of five sense organs and face outline.

In some embodiments, the real-time environment information includes, but is not limited to, real-time interne road condition information, real-time weather, real-time temperatures inside and outside the vehicle, luminance inside and outside the vehicle and so on.

In some embodiments, the real-time vehicle traveling speed includes, but is not limited to, relative speed of the vehicle.

In some embodiments, the driver detection device 12 mounted in the host is further configured to estimate head posture, specifically, configured to estimate three-dimensional posture information of these 3D-2D point pairs of the head using position information of the key points of face and offline-learned three-dimensional coordinate positions of average face upon a method of Perspective-n-Point mature in the field of camera calibration.

In some embodiments, the monitoring manner includes, but is not limited to, lane line monitoring, traveling distance monitoring, pedestrian distance monitoring, road edge monitoring, vehicle start and stop monitoring, and vehicle position monitoring.

In some embodiments, the warning manner includes, but is not limited to, machine sound warning, sensor vibration warning, and mobile phone vibration warning after the mobile phone is connected. The warning manner can be dynamically adjusted, for example, the warning manner can be adjusted according to the speed, and only when the speed exceeds a set value, the warning is notified.

In some embodiments, a set warning manner is as follows: sending a message to a pre-set contact to inform the driver's current state. In some embodiments, the warning manner includes, but is not limited to, a warning manner of voice robot chat to relieve fatigue. The voice machine chat may be in a form of playing soothing music, topic chat to guide the driver to talk, telling jokes and so on to relieve fatigue.

In some embodiments, the warning manner includes, but is not limited to: visual reminder, sound reminder, light reminder, and odor stimulation to the driver. Based on the above technical features, the head-up display device in the present embodiment at least has the following technical effects: according to the face state information, the real-time environment information, and the real-time vehicle traveling speed, the driver detection device 12 in the head-up display device in the present embodiment can analyze and monitor the driver's emotional states of distraction, fatigue, and road rage, and effective warning is realized via the host. Compared with the prior art, the head-up display device in the present embodiment analyzes the driver's emotions so as to strengthen analysis of and warning treatment on three emotions of distraction, fatigue, and road rage, effectively ensuring driving safety.

Preferably in the present embodiment, the driver detection device includes a camera 13 and a night vision compensation light unit 14.

The camera 13 is configured to collect overall face state information, head three-dimensional posture information, and information on opening/closing of eyes and mouth of the driver.

Preferably in the present embodiment, the night vision compensation light unit 14 is configured to perform light compensation when illumination intensity inside/outside the vehicle is lower than a threshold. The design of the night vision compensation light unit takes full account of the problem of insufficient light inside/outside the vehicle during night driving.

Preferably in the present embodiment, the overall face state information collected by the camera 13 includes, but is not limited to, classifying a face area by a CNN method to determine face state of the current driver on the whole.

Preferably in the present embodiment, the head three-dimensional posture information collected by the camera 13 includes, but is not limited to, estimating three-dimensional posture information of the head using position information of the key points of face and offline-learned three-dimensional coordinate positions of average face, these 3D-2D point pairs and a method of Perspective-n-Point mature in the field of camera calibration.

Preferably in the present embodiment, the eye and mouth states collected by the camera 13 include, but are not limited to, output of key points positioned on face, which result includes outline information on two eyes and mouth, through which outline information opening/closing state of two eyes and mouth can be precisely recognized.

In some embodiments, the driver detection device is further configured to collect state data of the driver, historical use data of the driver, and networked information related to current driving, synchronize with data collected by a driving recorder. And a warning model is established in cloud computation according to data in the driver detection device, to associate the data with accidents, predict confidence degree of occurrence of danger, and warn in advance.

In some embodiments, the host is connected with a CAN bus or an OBD inside the vehicle, to read traveling data of the vehicle.

In some embodiments, when the warning model is established in the cloud computation, the data and the accidents are associated through establishment of a learning model and use of a classifier such as SVM.

Figure 8:
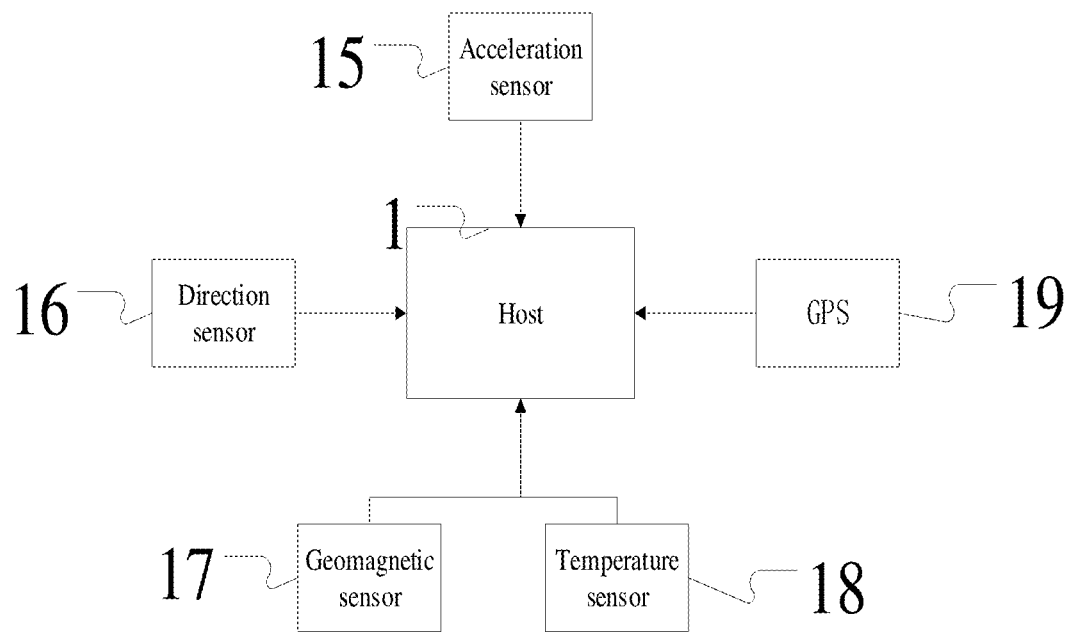
FIG. 8 is a schematic diagram of the head-up display device in FIG. 7 according to another preferred embodiment.

FIG. 8 is a schematic diagram of the head-up display device in FIG. 7 according to another preferred embodiment.

Preferably in the present embodiment, the host 1 further includes a direction sensor 16, an acceleration sensor 15, a GPS 19, a temperature sensor 18, and a geomagnetic sensor 17, wherein the temperature sensor 18 is configured to sense a temperature inside the vehicle and radiate heat, the geomagnetic sensor 17 is configured to detect a direction, the direction sensor 16 is configured to determine a heading or backing direction of the vehicle and measure the vehicle traveling distance, the acceleration sensor 15 is configured to detect braking and start of the vehicle, the GPS 19 is configured to locate a vehicle position and access a map, and provide an grade GPS antenna which is up to automobile parts standard for precise navigation and locating. Correspondingly, the host is provided with an ARM 4-core CPU processor, a 1G RAM memory, and pre-configured with a highly customized Android system based on on-board sceneries, and can be periodically synchronized and updated with cloud.

Figure 9:
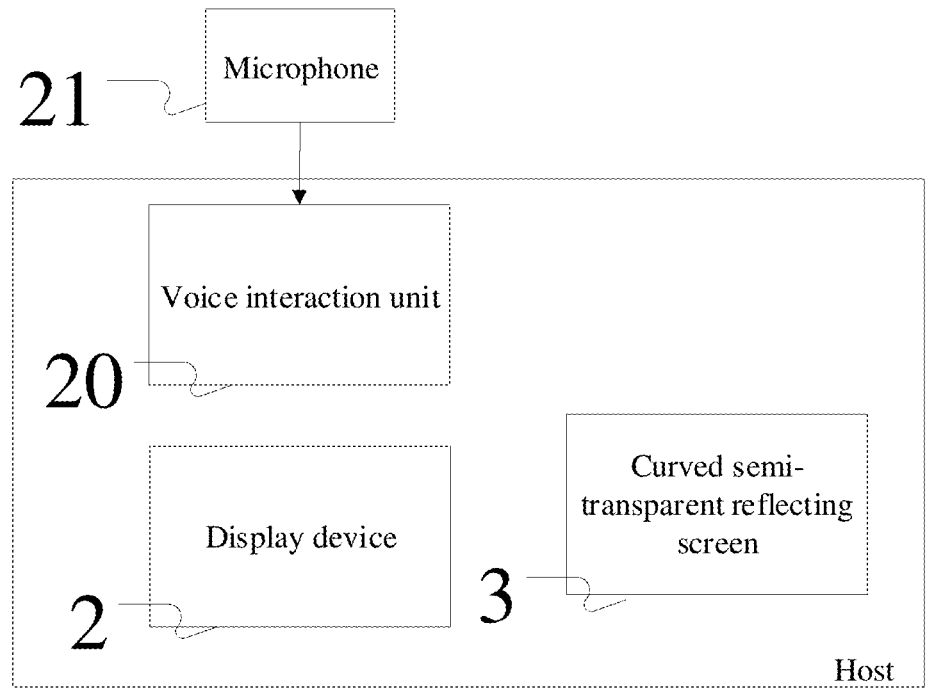
FIG. 9 is a structural schematic diagram of another head-up display device in the present disclosure.

As shown in FIG. 9, it shows a structural schematic diagram of another head-up display device in the present invention.

The head-up display device in the present embodiment includes: a host 1, configured to send an image signal to a display device, and collect sounds, and process an input; the display device 2 provided at one side of the host, configured to display the image signal; a curved semi-transparent reflecting screen 3 provided in a position opposite to the display device, configured to receive the image displayed by the display device, and display the image on a curved inner side of the semi-transparent reflecting screen; a voice interaction unit 20 pre-configured in the host, configured to search in a database according to information input by a user via voice, wherein if there are multiple eligible search results, a driver is reminded to make a choice.

Preferably in the present embodiment, the voice interaction unit is further configured to receive external activation to realize an activation function, including: customizable voice awakening activation, voice awakening activation phrase, physical button activation, and gesture activation. Preferably in the present embodiment, the voice interaction unit is further configured to receive in one step all information input by a user and complete input in one step. The all information input includes, but is not limited to: voice activation, entering a navigation function, setting a destination, and setting a path planning strategy. Compared with the prior art, the voice interaction unit in the present embodiment can treat user's requirements in one step, including activation, searching, navigation, and way finding, and realizing one-step analysis of multiple instructions to obtain a result. For example, "Turnip, I want to navigate to south gate of Tsinghua University, find me a fastest route."

Preferably in the present embodiment, the voice interaction unit is further configured to semantically parse user's natural voice information of the same meaning in different expression manners, and execute corresponding search: performing the search according to an input search result, wherein if a unique position is precisely found, this result is used; if multiple possible search results are found, secondary inquiry is needed, and further confirmation is made according to multiple times of natural voice input, wherein if a unique result is precisely found, this search result is used, otherwise, continue with the inquiry or remind repetition.

Preferably in the present embodiment, the voice interaction unit is further configured to: collect driver's voice input while the host outputs a voice;

detect the driver's voice input via VAD detection; and suspend voice playing of the host when the driver's voice input is detected.

In conventional voice interaction, men and machine speak in turn, and men are not allowed to interrupt when the machine is speaking, but should wait until the machine finishes. In a bargain method in the present embodiment, when the machine is speaking, men can break in, and after hearing men's speaking, the machine stops machine-synthesized sound output, and processes men's voice input.

Preferably in the present embodiment, the voice interaction unit further includes an echo elimination device, wherein the echo elimination device includes a first path of input and a second path of input.

The first path of input is configured to collect an outside voice input.

The second path of input is configured to connect an output of a speaker of the host with an input of a microphone.

Time points of the first path of input and of the second path of input above are synchronized, and an AEC algorithm is preferably used to eliminate echo respectively.

Preferably in the present embodiment, the device further includes a multi-channel voice output unit, configured to output different types of operation voices to different acoustic units, such that the driver simultaneously hears voice output results of different operations.

Preferably in the present embodiment, the device further includes a speaker, configured to output voice information to the outside.

Based on the above features, the head-up display device in the present embodiment at least has the following technical effects: with the voice interaction unit built in the host and the microphone outside the host, voice operations can be realized in multiple ways, for example, multiple times of voice interaction searches, clustering of destination positions, echo elimination, two-channel voice output, and voice smart bargain. With the voice interaction unit in the host, the driver further can be allowed to, by voice, navigate, make a call, send WeChat messages, send a location and so on. Compared with the in-vehicle head-up display devices that do not allow voice interaction or voice function operations in the prior art, notable progresses are possessed.

Figure 10:
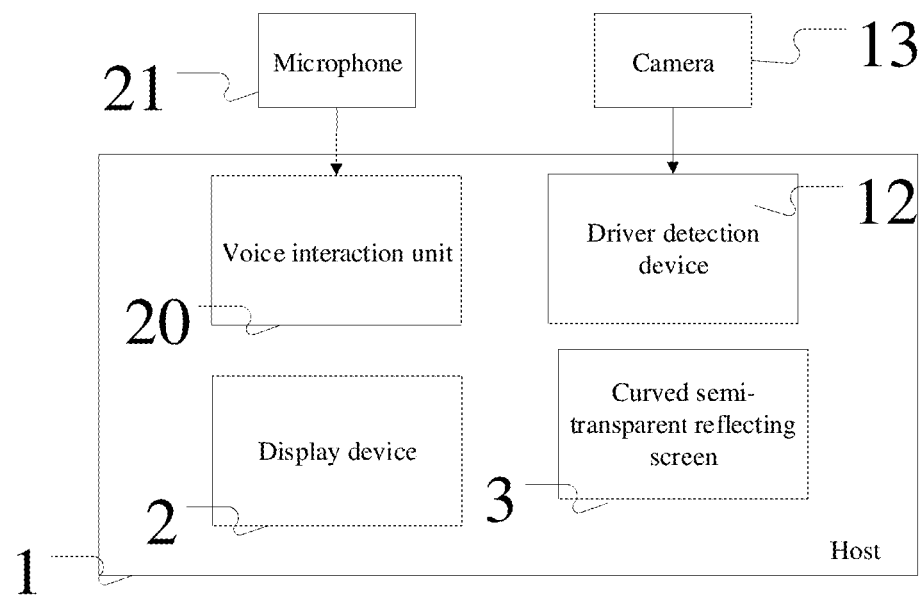
FIG. 10 is a structural schematic diagram of a preferred head-up display device in the present disclosure.

FIG. 10 is a structural schematic diagram of a preferred head-up display device in the present invention.

The head-up display device in the present embodiment includes:

a host 1, configured to send an image signal to a display device; the display device 2 provided at one side of the host, configured to display the image signal; a curved semi-transparent reflecting screen 3 provided in a position opposite to the display device, configured to receive an image displayed by the display device, and display the image on a curved inner side of the semi-transparent reflecting screen, wherein the semi-transparent reflecting screen is further configured to display the image after ghost is removed; a voice interaction unit 20 pre-configured in the host, configured to search in a database according to information input by a user via voice, wherein if there are multiple eligible search results, a driver is reminded to make a choice; and a driver detection device 12 mounted in the host, configured to determine face state information of a driver according to face information, and monitor and warn fatigue of the driver according to the face state information and real-time vehicle traveling speed.

In some embodiments, the display device 2 is a flexible display screen configured to change the image projected onto the curved semi-transparent reflecting screen by adjusting a shape of the flexible display screen, and correct the image distortion in the display device.

In some embodiments, the display device is a laser projector configured to project the image through laser beams; moreover, an MLA micro-lens array is provided between the curved semi-transparent reflecting screen and the laser projector, and configured to modulate display of the laser beams on the curved semi-transparent reflecting screen.

In some embodiments, the display device and the reflecting screen both can be electrically rotated to adjust an angle. Specifically, a relative distance between the display device and the reflecting screen can be adjusted, such that a distance of a virtual image seen by the driver can be adjusted. Compared with the prior art, increasing the distance between the display device and the reflecting screen can enable the user to see an image farther. In some embodiments, the camera mounted on a position of a rearview mirror inside the vehicle transmits video data to the host via wired connection, and displays a video on the host. A processing chip in the host can analyze the video using an image processing algorithm, realizing lane departure detection, forward collision warning, pedestrian detection and so on.

In some embodiments, the display device is one or more from TFT, LCD, OLED or AMOLED displays, and multiple substitution forms of the display device are provided in the present embodiment. In the above, TFT refers to Thin Film Transistor.

Preferably in the present embodiment, the host is provided with a base 4 configured to be placed on a maneuvering desk, preventing the host from sliding or shifting from position during driving. A rotating locking platform 5 is mounted on the base 4, and the rotating locking platform 5 is configured to be locked on a slide rail 6 on the base, and adjust the image on the curved semi-transparent reflecting screen via a placement angle of the host.

In some embodiments, the driver detection device 12 mounted in the host is further configured to estimate head posture, specifically, configured to estimate three-dimensional posture information of the head using these 3D-2D point pairs of position information of key points of face and offline-learned three-dimensional coordinate positions of average face upon a method of Perspective-n-Point mature in the field of camera calibration.

In some embodiments, the monitoring manner includes, but is not limited to, lane line monitoring, traveling distance monitoring, pedestrian distance monitoring, road edge monitoring, vehicle start and stop monitoring, and vehicle position monitoring.

In some embodiments, the warning manner includes, but is not limited to, machine sound warning, sensor vibration warning, and mobile phone vibration warning after the mobile phone is connected.

In some embodiments, the warning manner includes, but is not limited to, a warning manner of voice robot chat to relieve fatigue. The voice machine chat may be in a form of playing soothing music, topic chat to guide the driver to talk, telling jokes and so on to relieve fatigue.

Preferably in the present embodiment, the driver detection device includes a camera 13 and a night vision compensation light unit 14.

The camera 13 is configured to collect overall face state information, head three-dimensional posture information, and information on opening/closing of eyes and mouth of the driver.

Preferably in the present embodiment, the night vision compensation light unit 14 is configured to perform light compensation when illumination intensity inside/outside the vehicle is lower than a threshold. The design of the night vision compensation light unit takes full account of the problem of insufficient light inside/outside the vehicle during night driving.

Based on the above features, the head-up display device in the present embodiment at least has the following technical effects: the display of the image information in a vehicle traveling process is realized with a simple imaging principle, overcoming the deficiency of the current manner of projection imaging, and satisfying requirements of placement on different control consoles and effective imaging in different traveling sceneries. The driver detection device mounted in the host can monitor the driver and a traveling environment of the vehicle via a front/rear camera in the host, and capture the face state information of the driver via the front camera, to analyze the driver's emotions so as to enhance analysis of and warning treatment on three emotions of distraction, fatigue, and road rage, effectively ensuring driving safety, and having prominent substantive features; with the voice interaction unit built in the host and the microphone outside the host, voice operations can be realized in multiple ways, for example, multiple times of voice interaction searches, clustering of destination positions, echo elimination, two-channel voice output, and voice smart bargain. With the voice interaction unit in the host, the driver further can be allowed to, by voice, navigate, make a call, send WeChat messages, send location and so on. Compared with the head-up display devices in the prior art that do not allow voice interaction or voice function operations, notable progresses are possessed.

Figure 11:
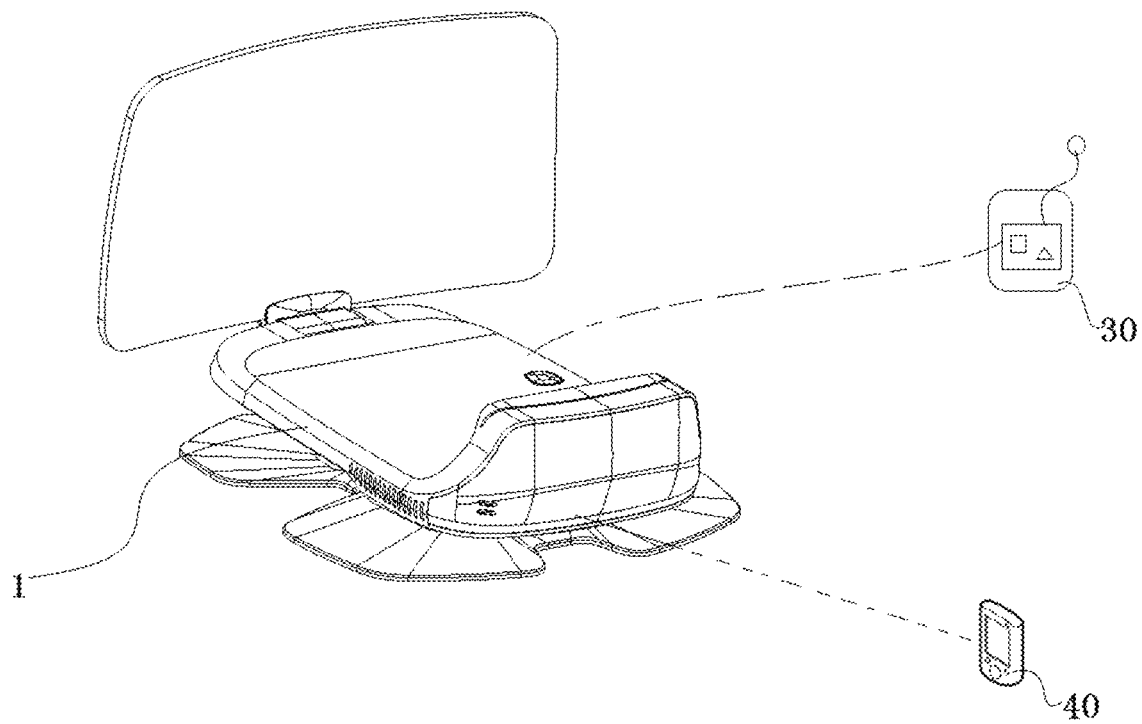
FIG. 11 is a schematic diagram of a further optimized external device in FIG. 10.

FIG. 11 is a schematic diagram of a further optimized external device in FIG. 10.

Preferably in the present embodiment, the head-up display device further includes a remote control device, and the remote control device is configured to awaken, turn on, and turn off the host within a set range, and adjust imaging angles of the display device and of the curved semi-transparent reflecting screen. Preferably in the present embodiment, the external equipment of the head-up display device may be a smart mobile terminal 40, and the head-up display device is connected to the external equipment in a manner including, but not limited to, wi-fi, Bluetooth, NFC and so on. The head-up display device is connected to the network in a manner including, but not limited to, wireless AP, GPRS, 3G/4G and so on.

Figure 12:
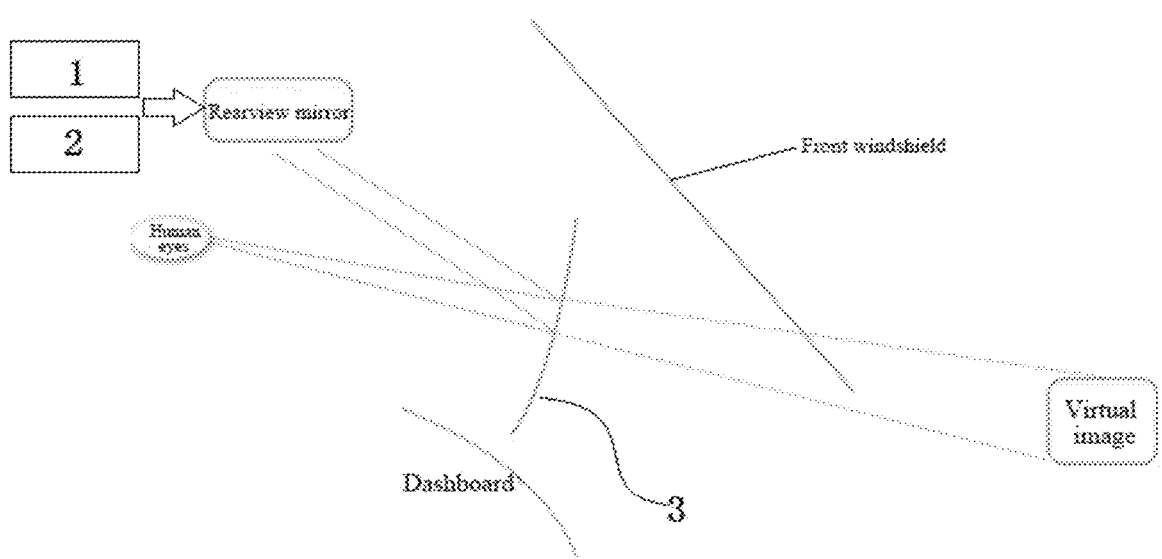
FIG. 12 is a schematic diagram of a split mounting structure in FIG. 10.

FIG. 12 is a schematic diagram of a split mounting structure in FIG. 10.

Preferably in the present embodiment, the head-up display device in the present embodiment also may be in a split configuration, specifically including following structures:

a host 1, configured to send an image signal to a display device;

the display device 2 provided at one side of the host, configured to display the image signal, a curved semi-transparent reflecting screen 3 provided in a position opposite to the display device, configured to receive an image displayed by the display device, and display the image on the other side of the semi-transparent reflecting screen at one side of the host, wherein the semi-transparent reflecting screen is further configured to display the image after ghost is removed;

a voice interaction unit pre-configured in the host, configured to search in a database according to information input by a user via voice, wherein if there are multiple eligible search results, a driver is reminded to make a choice; and a driver detection device mounted in the host, configured to determine face state information of a driver according to face information, and monitor and warn fatigue of the driver according to the face state information and real-time vehicle traveling speed.

Preferably in the present embodiment, the display device 2 and the host 1 are provided on a rearview mirror, the curved semi-transparent reflecting screen 3 is provided on a dashboard, and displays the image after primary reflection. The voice interaction unit and the driver detection device are integrated in the host.

Preferably in the present embodiment, the display device 2 acquires from external equipment an image that needs to be displayed in a manner of wireless or wired connection. The external equipment includes, but is not limited to: mobile phones or other smart terminals that are accessible wirelessly.

Figure 13:
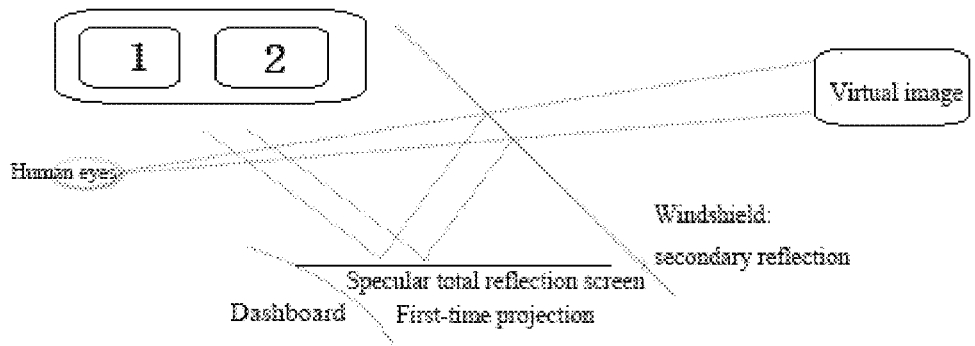
FIG. 13 is a structural schematic diagram of a split head-up display device in the present disclosure.
Figure 14:
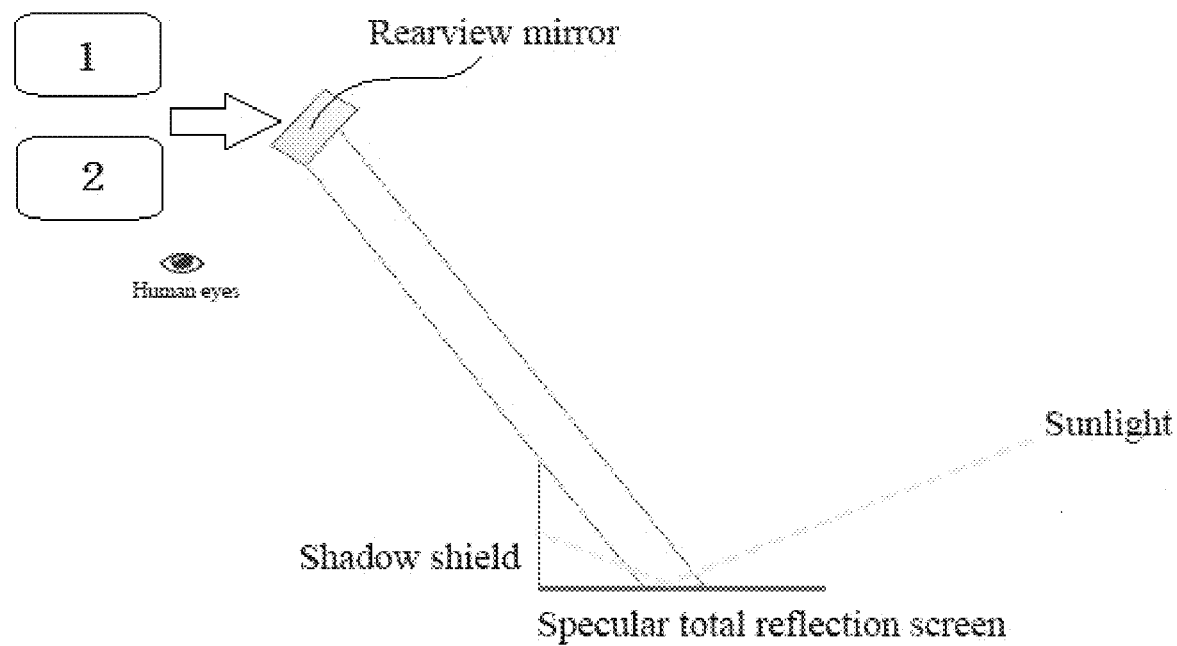
FIG. 14 is a structural schematic diagram of the split head-up display device in FIG. 13 according to another preferred embodiment.

FIG. 13 is a structural schematic diagram of a split head-up display device in the present invention. FIG. 14 is a structural schematic diagram of the split head-up display device in FIG. 13 according to another preferred embodiment.

The split head-up display device in the present embodiment includes:

a host 1, configured to send an image signal to a display device;

the display device 2 provided at one side of the host, configured to display the image signal;

a total reflection screen, configured to perform primary reflection for an image displayed by the display device, and form a virtual image upon secondary reflection of a windshield, wherein the virtual image resulted from the secondary reflection can be seen through the windshield;

a shadow shield located at one side of the total reflection screen, configured to block reflection light, such that sunlight emission is shielded, and the sunlight cannot be reflected into human eyes, wherein the display device and the host are provided on a rearview mirror, the total reflection screen is provided on a dashboard, and the image is displayed on a front windshield upon two times of reflection;

a voice interaction unit pre-configured in the host, configured to search in a database according to information input by a user via voice, wherein if there are multiple eligible search results, a driver is reminded to make a choice; and a driver detection device mounted in the host, configured to determine face state information of a driver according to face information, and monitor and warn fatigue of the driver according to the face state information and real-time vehicle traveling speed.

Preferably in the present embodiment, the display device 2 acquires from external equipment an image that needs to be displayed in a manner of wireless or wired connection. The external equipment includes, but is not limited to: mobile phones or other smart terminals that are accessible wirelessly.

What is claimed is:

1. A head-up display device, comprising: a host, configured to send an image signal to a display device; the display device provided at one side of the host, configured to display the image signal; and a curved semi-transparent reflecting screen provided in a position opposite to the display device, configured to receive an image displayed by the display device, and display the image on the other side of the semi-transparent reflecting screen at one side of the host, wherein the semi-transparent reflecting screen is further configured to display the image after ghost is removed, wherein the display device is a laser projector, configured to project the image through laser beams; and a micro-lens array is provided between the curved semi-transparent reflecting screen and the laser projector, and configured to modulate the display of the laser beams on the curved semi-transparent reflecting screen.

2. The head-up display device according to claim 1, wherein the display device is a flexible display screen, configured to change the image projected onto the curved semi-transparent reflecting screen by adjusting a shape of the flexible display screen, and correct image distortion in the display device.

3. The head-up display device according to claim 2, wherein the host is provided with a base, a rotating locking platform is mounted on the base, and the rotating locking platform is configured to be locked on a slide rail on the base, and adjust a position of the image on the curved semi-transparent reflecting screen via a placement angle of the host.

4. The head-up display device according to claim 1, wherein the ghost is removed from the image after following treatments are performed for the semi-transparent reflecting screen: molding the semi-transparent reflecting screen, and surface hardening both a concave surface and a convex surface of the semi-transparent reflecting screen; providing a semi-transparent mirror film to the concave surface; providing an Anti-reflection film to the convex surface; additionally providing an Anti fingerprint film to the concave surface and/or the convex surface; and finally performing all-around cutting for the semi-transparent reflecting screen.

5. The head-up display device according to claim 4, wherein the host is provided with a base, a rotating locking platform is mounted on the base, and the rotating locking platform is configured to be locked on a slide rail on the base, and adjust a position of the image on the curved semi-transparent reflecting screen via a placement angle of the host.

6. The head-up display device according to claim 1, wherein the host is provided with a base, a rotating locking platform is mounted on the base, and the rotating locking platform is configured to be locked on a slide rail on the base, and adjust a position of the image on the curved semi-transparent reflecting screen via a placement angle of the host.

7. A head-up display device, comprising: a host, configured to send an image signal to a display device; the display device provided at one side of the host, configured to display the image signal; a curved semi-transparent reflecting screen provided in a position opposite to the display device, configured to receive an image displayed by the display device, and display the image on the other side of the semi-transparent reflecting screen at one side of the host, wherein the display device is a laser projector, configured to project the image through laser beams; and a micro-lens array is provided between the curved semi-transparent reflecting screen and the laser projector, and configured to modulate the display of the laser beams on the curved semi-transparent reflecting screen; and a driver detection device mounted in the host, configured to determine face state information of a driver according to face information, wherein the state information at least comprises emotional state information on distraction, fatigue, and road rage, and monitor and warn fatigue of the driver according to the face state information, real-time environment information, and real-time vehicle traveling speed.

* * * * *